Jan. 2, 1951 G. TITUS 2,536,585
ANIMAL TRAP

Filed Sept. 21, 1949 2 Sheets-Sheet 1

Inventor
George Titus

By Clarence A. O'Brien
and Harvey B. Jacobson
Attorney

Jan. 2, 1951  G. TITUS  2,536,585
ANIMAL TRAP

Filed Sept. 21, 1949  2 Sheets-Sheet 2

Inventor
George Titus

By *Clarence A. O'Brien
and Harvey B. Jacobson*
Attorneys

Patented Jan. 2, 1951

2,536,585

UNITED STATES PATENT OFFICE 2,536,585

ANIMAL TRAP

George Titus, Minto, Alaska

Application September 21, 1949, Serial No. 116,973

1 Claim. (Cl. 43—63)

This invention relates to an animal trap, and more particularly to an animal trap which upon actuation of its trigger will completely encage an animal within its jaws.

An object of this invention is to provide an animal trap which will completely encompass a wild animal, bird, fish, or other wild life within its jaws upon actuation thereof without hurting or otherwise affecting the beast, except for restraining and retaining it.

Other objects reside in the provision of an animal trap which is substantially fool-proof in operation so as to retain a much larger number of the animals which spring the trap.

An important feature of this invention is the spring pressed annularly spaced jaw members which are sprung together so as to form a cage for the trapped animal.

Still other objects of the invention reside in the provision of an animal trap that is strong, durable, simple in construction, relatively cheap to manufacture, and easy to set and position in order to trap wildlife.

These, together with the various ancillary objects of the invention which will later become apparent as the following description proceeds are attained by this animal trap, a preferred embodiment of which has been illustrated, by way of example only, in the accompanying drawings, wherein.

Figure 1:
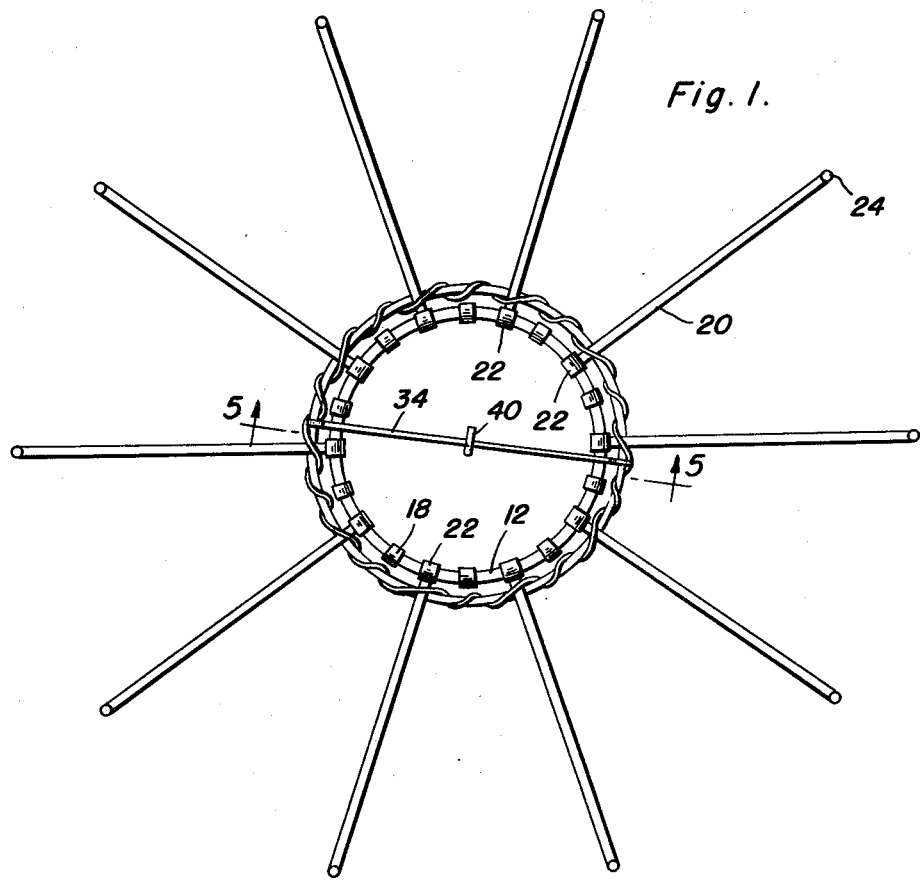
Figure 1 is a top plan view of the animal trap showing it in its "set" position.

With continuing reference to the accompanying drawings, wherein like reference numerals designate similar parts throughout the various views, 10 designates a base ring on which another ring 12 is held in spaced relation by standards 14. The standards 14 are provided with curved portions 16 and 18 adapted to surround the rings 10 and 12 respectively to hold them in their spaced relationship.

Figure 3:
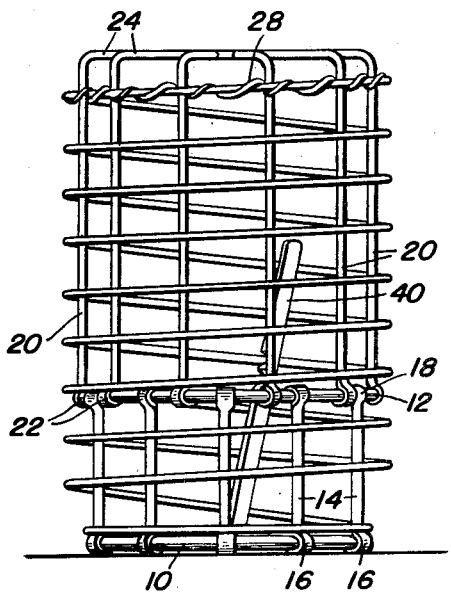
Figure 3 is an elevational view of the device showing it after the trigger has been sprung and the jaw members actuated to form a cage.
Figure 4:
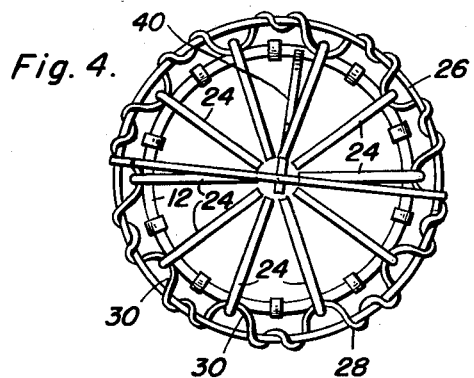
Figure 4 is a top plan view of the device as shown in Figure 3.
Figure 6:
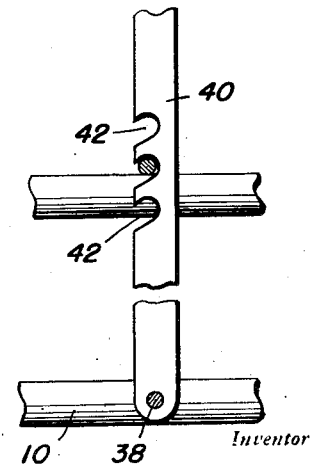

Secured to the second or upper ring 12 are a plurality of annularly spaced jaw members 20 with substantially L shape and having their longer legs formed with a circular embracing portion 22 for pivotal and rotatable connection and attachment to the ring 12. The upper shorter legs of the jaw members 20 as designated by reference numeral 24 which in the position as shown in Figure 2 extend vertically upward, and in the position as shown in Figures 3 and 4 extend inwardly toward each other.

A coil spring 26 is secured at one end as by welding, a friction wrapping, or other means, in engagement with the ring 10. A wire member 28 is inter-wound around the other end of the coil spring 26 so as to provide loops 30 for sliding engagement of the coil 26 and the jaws 20.

Secured to one end of the coil 26 as at 32 is a catch rod 34 having a hook or catch 36 at its free end. By means of a shaft 38 diametrically secured across the ring 10 and having a trigger lever 40 journaled thereon, means for holding the rod 34 in a "set" position are provided. The rod 40 is provided with a series of notches 42 for selective engagement of the rod 34. The size of the beast to be caught can be partially determined by the notch 42 which is used.

Figure 2:
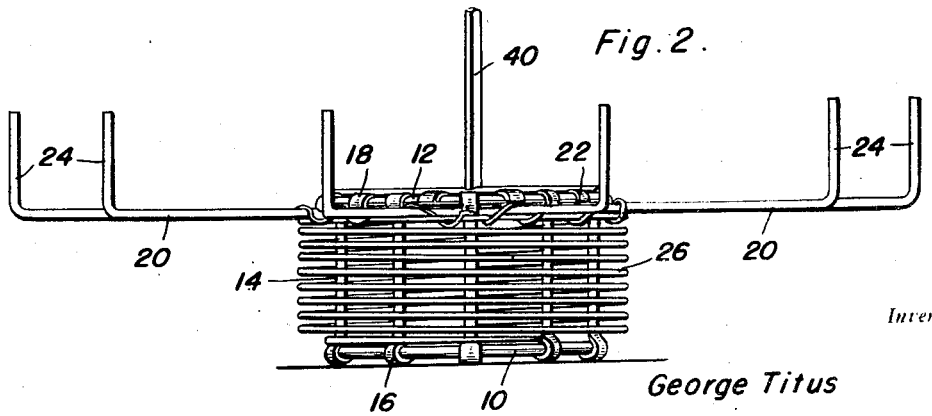
Figure 2 is a front elevational view of the animal trap comprising the present invention, showing it in its "set" position.
Figure 5:
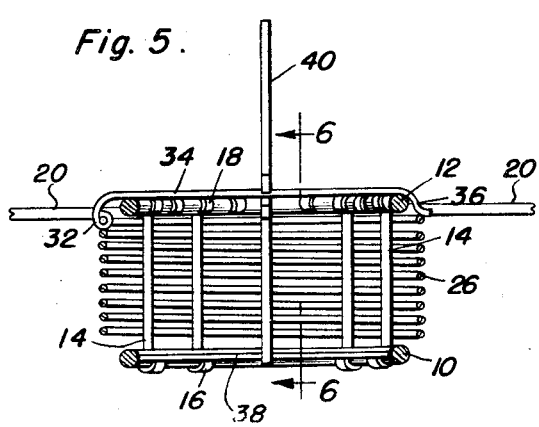
Figure 5 is a vertical sectional view of the embodiment as shown in Figure 2 and as taken along a diameter of the ring forming one element of the invention; and, Figure 6 is a sectional detail showing the manner in which the trigger means is connected so as to retain the trap in a "set" condition.

The device is operated as follows: when the rod is in a "set" position as shown in Figures 1, 2 and 5, the catch 34 is bent so the hook portion 36 is secured over the ring 12. The rod 34 is held in place by being inserted in a notch 42 of the trigger lever 40. The jaw members or arms 20 are outwardly extended in a horizontal direction from the ring 12. These arms may be as desired suitably camouflaged. Suitable bait, as desired, may be employed and inserted in the trap relative to the trigger 40. Upon actuation of the trigger, the catch rod is released, whereby the pressure of the spring 26 forces it off the ring 12 allowing the whole spring to rise upwardly to the position as shown in Figures 3 and 4. The shorter leg portions 24 will cover over the top of the trap, and the jaw members 20, together with the spring 26 will form a complete and satisfactory cage for the animal. Of course, the ring 10 may be suitably anchored to the ground or other suitable place.

While the trap may be made in any convenient size and is especially adapted to catch wild animals, it may be used to catch fish by mounting upon a suitable pole stuck in the river or lake bed, or may be used to catch birds by suitable emplacement in a tree.

Since from the foregoing, the construction and advantages of this animal trap are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be resorted to which fall within the scope of the appended claim.

Having described the invention, what is claimed as new is:

A trap comprising a pair of spaced rings, a plurality of annularly spaced standards terminally connected to said rings, a plurality of substantially L-shaped jaw members rotatably connected to a first of said rings, a coil spring secured at one end thereof to the second of said rings, the other end of said coil spring being slidably connected to said L-shaped members, a rod pivotally connected at one end to one end of said coil spring, the other end of said rod being shaped as a hook for selective engagement with said first ring, a shaft secured diametrically across said second ring and terminally connected thereto, and a trigger journalled on said shaft, said trigger being adapted to engage said rod.

GEORGE TITUS.

REFERENCES CITED

The following references are of record in the file of this patent:

UNITED STATES PATENTS

| Number | Name | Date |
|---|---|---|
| 189,805 | Smith | Apr. 17, 1877 |
| 1,534,969 | Lawrence | Apr. 21, 1925 |